United States Patent [19]

Boulton et al.

[11] Patent Number: 4,570,162
[45] Date of Patent: Feb. 11, 1986

[54] LOCAL AREA NETWORKS

[75] Inventors: Peter I. P. Boulton; E. Stewart Lee, both of Islington; William E. Davidson, Toronto, all of Canada

[73] Assignee: The University of Toronto Innovations Foundation, Toronto, Canada

[21] Appl. No.: 417,496

[22] Filed: Sep. 13, 1982

[51] Int. Cl.[4] .............................................. H04Q 9/00
[52] U.S. Cl. .................................. 340/825.5; 370/93; 370/60; 340/825.52
[58] Field of Search ........... 340/825.5, 825.02, 825.04, 340/825.52; 370/60, 108, 93, 94; 375/106; 307/518

[56] References Cited

U.S. PATENT DOCUMENTS

| | | | |
|---|---|---|---|
| 4,099,028 | 7/1978 | Towson, IV | 370/93 |
| 4,181,975 | 1/1980 | Jenkins | 307/518 |
| 4,347,498 | 8/1982 | Lee et al. | 370/94 |
| 4,380,063 | 4/1983 | Janson et al. | 370/60 |
| 4,390,985 | 6/1983 | Fourcade et al. | 370/94 |
| 4,426,713 | 1/1984 | Shimizu et al. | 370/108 |
| 4,451,827 | 5/1984 | Kahn et al. | 370/60 |
| 4,484,325 | 11/1984 | Wilson et al. | 370/60 |

Primary Examiner—Donald J. Yusko
Attorney, Agent, or Firm—Fleit, Jacobson, Cohn & Price

[57] ABSTRACT

A data transmission network includes a number of access controllers connected to a central hub. The hub includes an arbitrator to select only one access controller for data transmission. Upon selection of one controller all other controllers are disabled to prevent collision of data packets. An interlock prevents enablement of a disabled controller until the data packet received by the transmitter has terminated to prevent transmission of part of a data packet. Synchronization between the data and a master clock is obtained by an initial coarse synchronization and a subsequent fine synchronization. The coarse synchronization is obtained by generation of a number of identical signals with a time delay between each signal. A clock pulse latches to one of the signal paths to provide the initial coarse synchronization.

11 Claims, 8 Drawing Figures

LOCAL AREA NETWORKS

The present invention relates to data transmission systems and in particular networks for the exchange of packets of data between remote locations.

Networks for data transmission are well known in which a number of independent modems or terminal devices which connect to the network communicate through a switching apparatus for the exchange of packets of data between the terminals. Because of the possibility of simultaneous transmission from the modems or terminal devices it is necessary to ensure that the switching apparatus can control the transmission of data in an orderly manner so that only a single data transmission is transmitted at a given time.

The configuration of existing network systems falls into one or two categories. In the first category the switching apparatus is in the form of a ring with each modem connected to an access station in the ring. Control of the transmission of data packets within the ring can be accomplished by means of a token passed around the ring. The token is constantly circulated through the ring until it is taken by one access station which is to transmit a packet of data.

Control can also be achieved by the empty slot ring system in which a series of slots circulates through the ring and access to the ring is obtained by way of an empty slot.

Control can also be achieved by the insertion ring in which a shift register can be connected selectively into the ring so that data stored in the shift register may be inserted into the data circulating within the ring.

The alternative configuration currently available is that using a data bus in which a number of access controllers are tapped into a passive line. To transmit a message from one of the access controllers to another access controller, the transmitting modem monitors the passive line and, if no message is being transmitted, will commence to transmit data. If a different transmission is sensed on the bus then the transmitting modem or terminal device defers to the carrier and will seek access at a later date.

Because of the time lag between the start of transmission from a modem or terminal device and the appearance of that transmision on the line at the most remote modem or terminal device from that tramsitting, it is possible to obtain undesirable simultaneous interfering trnasmissions. In these circumstances a collision occurs which effectively destroys the data being transmitted. If the data packet is of shorter duration than the time taken for the data to arrive at the most remote point on the line there is a possibility that a collision will occur without the transmitting modem or terminal device detecting that such a collision has occurred. It is therefore necessary to ensure that all the data packets transmitted have a duration of twice the transmission time between the most remote points in the network. In this manner the transmitting modem or terminal device can always be aware of a collision and can then seek re-transmission of the data packet. In seeking re-transmission it is usual to select a random time interval which gradually increases between starts of transmission. The random time interval between transmissions escalates quite rapidly which leads to a rapid escalation of delays in the network. Further the fact that the data packet has to be of a predetermined minimum length means that comparatively short messages do not lead to any economy in the utilization of the data bus.

It is an object of the present invention to provide a data transmission system in which the above disadvantages are obviated or mitigated.

According to the present invention there is provided a data transmission network comprising a plurality of access controllers each of which is connected by both a transmission link and a reception link to a hub. The hub comprises selection means connected to the hub end of each transmission link, which operates to select a single packet from one of said transmission links, and broadcast means connected to the reception link corresponding to each transmission link from an access controller to the hub. The effect is to transmit, one at a time, a packet originating at an access controller, selected by the selection means in the hub, to the broadcast means, and thence to all access controllers.

In general terms therefore the present invention provides a local area network in which each modem or transmission device is connected to the hub by a pair of data paths in the form of either wires or glass fibre cables. One of the data links is connected to the selection side of the hub and the other data link is connected to the broadcast side of the hub. The selection side of the hub includes a selector which selects only one packet of data and transits it through a link to the broadcaster. That packet is then received by all the access controllers. Each access controller monitors each packet received, retaining packets intended for it, and also looking for the reception of the broadcast of each packet it previously transmitted. If a packet transmitted by one of the access controllers is not received by that access controller, it will recognize that its packet has not been selected and will re-transmit the packet.

The arrangement avoids the need for a minimum packet size as the selector means will only select one packet and thereby avoid destructive collision.

An embodiment of the invention will now be described by way of example only with reference to the accompanying drawings in which.

Figure 1:
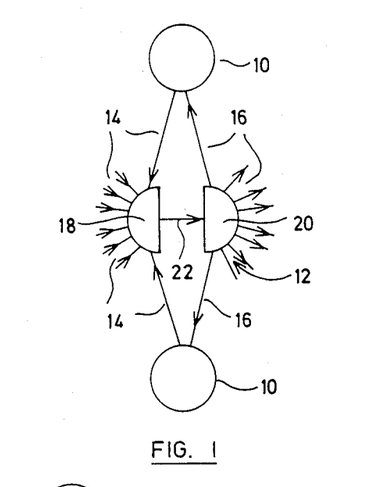
FIG. 1 is a diagrammatic representation of a local area network

Referring now to FIG. 1 a local area network for data transmission comprises a number of access controllers or modems 10 connected to a hub generally designated 12 by means of a transmission link 14 and a reception link 16, each of which may conveniently be optic fibres. The hub 12 is divided into a selection means 18 and a broadcast means 20 interconnected by a nexus 22.

Each of the transmission links 14 is connected to the selection means 12 and each of the reception links 16 is connected to the broadcast means 20.

The data packet is introduced at the access controller 10 and delivered through transmission link 14 to the selection means 18. The selection means 18 selects a single data packet and transmits this across the nexus 22 to the broadcast means 20. The broadcast means then simultaneously transmits the data packet to each of the reception links 16 so that they are received at each of the access controllers 10. The transmitted data packet and the received data packet are compared at the transmitting access controller 10 to provide verification that the data packet has in fact been transmitted. If no such verification is received then the data packet is re-transmitted to the selection means until the data packet is selected and broadcast.

Figure 2:
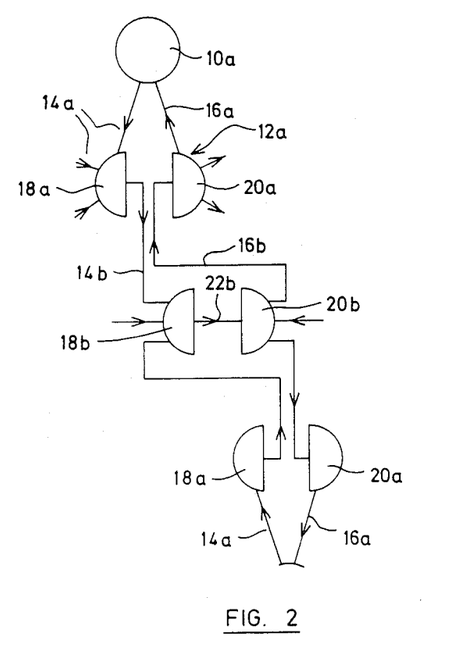
FIG. 2 is a diagrammatic representation of a modification to the network of FIG. 1 to accommodate an increased number of modems

To increase the number of access controllers available to the network, a plurality of hubs 12 may be arranged in a cascade as indicated in FIG. 2. In this arrangement like reference numerals indicated similar components to those shown in FIG. 1 with alphabetic suffixes used for clarity of description. The access controllers 10a are connected in groups to a slave hub 12a through respective transmission links 14a and reception links 16a. The output from a selection means 18a of hub 12a provides a transmission link 14b to a central hub 12b having a selector means 18b. The hub 12b is connected to slave hubs 12a and may receive from each slave hub 12a a selected transmission packet. The central selector 18b selects one of the transmission links 14b and transmits its data packet across the nexus 22b of the central hub. The central broadcaster 18b then transmits this packet to each of the slave braodcasters 18a and then to the access controllers 10a.

Figure 3:
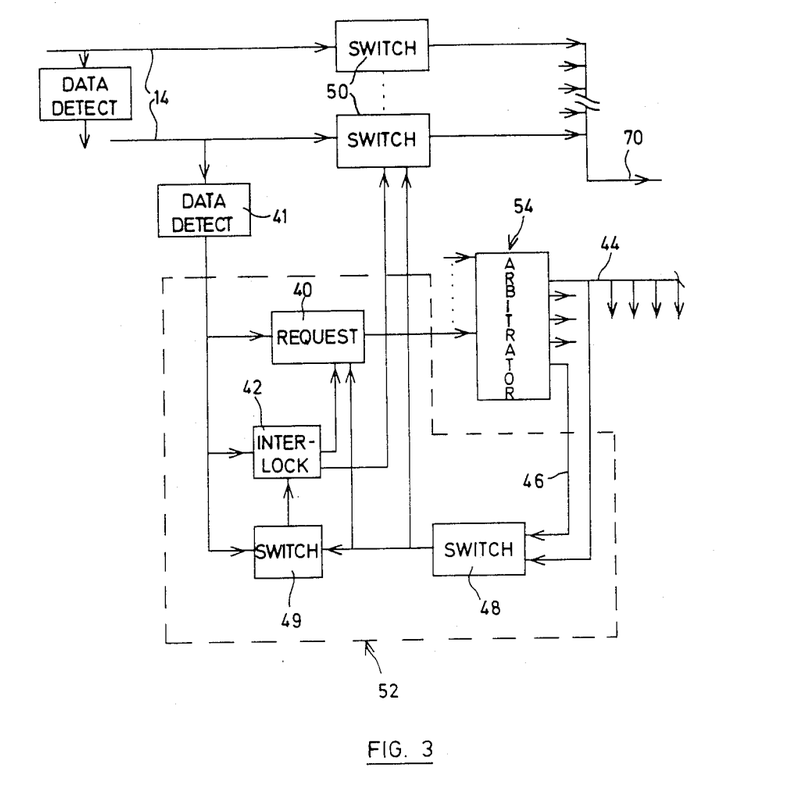
FIG. 3 is a block diagram of the components of the selector and arbitrator incorporated in the network of FIG. 1

To prevent the passage of more than one packet of information between the selector means 18 and broadcaster means 20, it is necessary to provide a selection device that excludes all packets except the packet selected for transmission. The selection device is schematically shown in FIG. 3 and includes a switch function 50 and selector 52 for each access controller and an arbitrator 54 that operates on request signals generated by the selectors 52 to control the passage of data to the selection means output 70. Each transmitting link 14 is connected to a switch function 50 and the outputs of the switch function 50 are connected in parallel to the output 70 of the selection means. In each selector, access to the output 70 is controlled by a request function 40 that receives an input from a data detect function 41 and requests through the arbitrator 54 access to the output 70 of the selection means. The arbitrator 54 is connected to the request function of each of the links 14 and determines which one of the links 14 will be connected to the output 70 of the selection means. The arbitrator 54 has two output functions, 44, 46, one of which 44 is common to all the selectors 52 and indicates when the output 70 of the selection means is in use. The second function 46, is individual to each selector 52 and indicates if the associated link 14 has been chosen for access to the output 70 of the selection means. The functions 44, 46 control through a switch 48 the request function 40 and switch 50 so enabling signals are provided only when the output 70 is not occupied and its link has been selected for transmission. The selected function 46 is necessary to override the busy function 44 to maintain the enabling signals to request function 40 and switch 50 despite the busy function 44 indicating that the output 70 is in use.

Enablement of the request function 40 is controlled by an interlock function 42 which is necessary to prevent a portion of a data packet being transmitted should the output 70 become available during transmission of the data packet. The interlock function 42 is controlled by switch 49 that receives control signals from the data detect function 41 and the busy function 44. The interlock function 42 is enabled, i.e. conditioned to prevent access to the request function, if the output 70 is in use by another link 14 as indicated by the busy function 44 and is locked in the enabled condition if a data transmission starts whilst the nexus 22 is occupied. Upon termination of both the data transmission and the occupation of the output 70, the interlock 42 will be disabled to permit access to the request function 40.

Thus, upon start of a data transmission with the output 70 available an indication that data is being transmitted is received at request function 40 that requests access to the output 70 through arbitrator 54. The arbitrator selects the link 14 and generates a busy signal to disable all the other request functions and a selected signal for the selected one of links 14. The request function 40 and switch 50 is thus enabled to allow data to flow to the output 70. The interlock 42 remains disabled as the signal from the switch 48 indicates that the link 14 has been selected.

Should however the output 70 be occupied at the time of the start of data transmission, the request function 40 and switch 50 will be disabled by the signal of busy function 44. The interlock 42 is also enabled to prevent enabling of the request function until after the data transmission in link 14 has ended.

Figure 4:
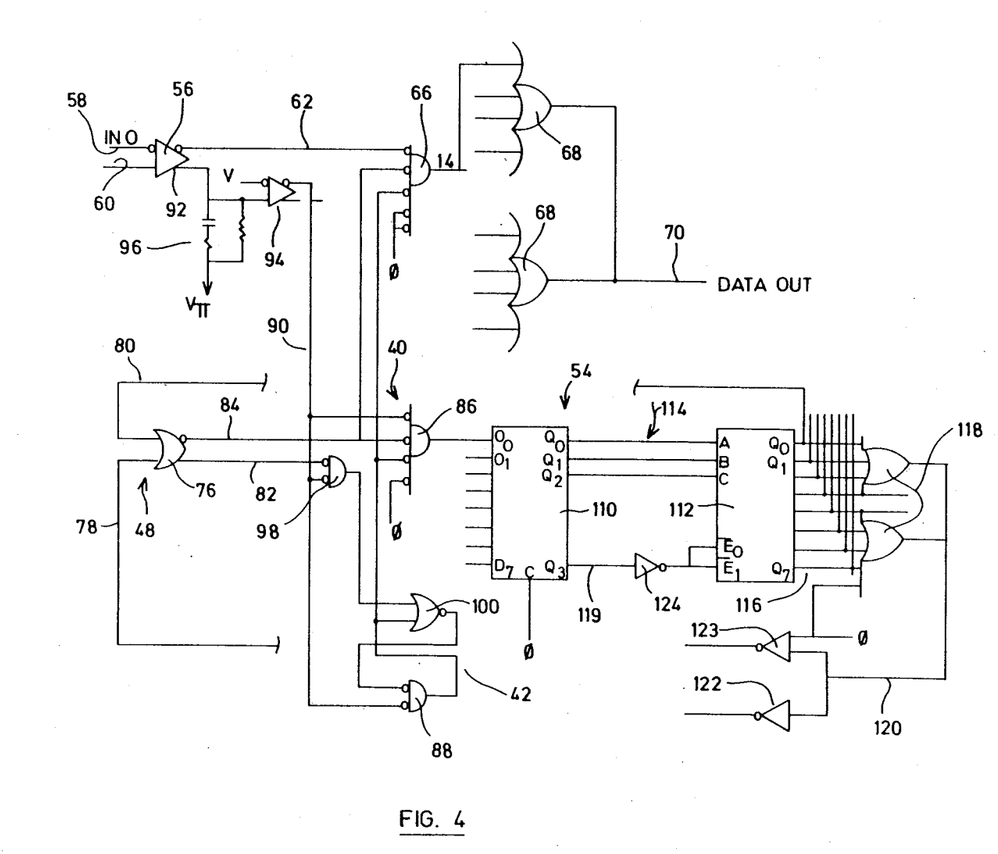
FIG. 4 is a schematic diagram of the imnplementation of the components shown in FIG. 3

A preferred implementation of the functions shown in FIG. 3 is shown in FIG. 4. Data received from the transmission links 14 is passed to a buffer amplifier 56 as a balanced pair of differential inputs 58, 60. One output 62 of the amplifier 56 forms a first inverted input 64 of an NOR gate 66 that constitutes the switch function 50 and controls passage of data from the transmission links 14 to the output 70. The output of the NOR gate 66 is connected to one of a pair of OR gates 68 whose outputs provide a data bus to the output 70. Each input of the OR gates 68 is associated with a respective one of the transmission links 14 through an NOR gate 66.

The switch 48 comprises an OR gate 76 that receives two inputs, 78, 80 from the arbitrator 54. The input 78 provides the function 44 and is a signal that is high whenever the output 70 is available, i.e. no access controller is selected, and goes low upon the output 70 being occupied. The input 80 provides the selected function 46 and is a signal that is indicative of the access controller selected for data transmission through the output 70 and goes high upon the arbitrator 54 selecting the port with which the selector 52 is asociated. At all other times the signal is low.

OR gate 76 has an output 82, that provides a control signal to the interlock 42 and an output 84 that provides control signals to the switch 50 and request function 40. The output 82 is the logical OR function of inputs 78 and 80 whereas the output 84 provides the inverse of output 82. Thus upon the output 70 being available for transmission of data, the input 78 will be high to produce a high signal at output 82 and a low signal at output 84. Similarly, upon the arbitrator selecting the access controller of OR gate 76, the input 80 will be high to produce a low signal at output 84 and a high signal at output 82. If an access controller other than that associated with OR gate 76 is chosen, both inputs 78,80 will be low resulting in a high signal at output 84 and a low signal at output 82. The output 84 is connected directly to NOR gate 66 and to an AND gate 86 whose output is connected to arbitrator 54 and provides the request function 40, The output 84 therefore provides one control signal for the switch 50 and the request function 49 and inhibits those functions when a high signal exists at output 84, that is, whenever the output 70 is occupied. A second input to AND gate 86 is derived from the interlock function 42 as the output of AND gate 88. This output also provides the third input to NOR gate 66 so that a high signal at the output of AND gate 88 inhibits NOR gates 66 and 86 to prevent both transmission of data and generation of a "request" signal.

An indication that data is being transmitted is provided by a signal line 90 connected to an output 92 of buffer amplifier 56 through a buffer amplifier 94 and an RC circuit 96. The RC circuit 96 retards transition of a signal going from "high" to "low" so that transient conditions in the data packet do not affect the signal in line 90 that is low whenever data is being transmitted. In the preferred implementation, data being transmitted will not remain low for more than three consecutive bit times.

The line 90 is connected directly to the NOR gate 86, and directly to one input of an NOR gate 88 that forms part of interlock function 42. The signal line 90 and output 82 of OR gate 76 are connected to an NOR gate 98 that constitutes the switch 49 and whose output is connected to a NOR gate 100 to provide a second input to interlock 42. The second input to NOR gate 100 is taken from the output of NOR gate 88 and the output of OR gate 100 inverted and connected as the second input of NOR gate 88. The output of NOR gate 88 also provides the output of interlock function 42 and is connected to the NOR gate 86 of request function 40 and to the NOR gate 66 of switch function 50 so that a high output inhibits these functions and maintains a stable latched state for the interlock function 42.

The operation of the selector 52 may best be described by first assuming that no data is being transmitted across the link and no data is being transmitted to the access controller. In this condition input line 58 is high and input line 60 is low producing a high signal at output 62, and a low signal at the input to buffer amplifier 94. The signal line 90 is thus high, forcing low the outputs of NOR gate 86, NOR gate 98, and NOR gate 88. The low output from NOR gate 88 and NOR gate 98 therefore produce a high signal at the inverted output of OR gate 100 and low signals at inputs to NOR gates 66 and 86 enabling switch function 50 and request function 40.

With the output 70 available, the input 78 to OR gate 76 is high and the input 80 low and thus output 82, is high and output 84 is low to permit access of data to the request function and the output 70.

If data is being received from another transmission link 14 which is occupying the output 70, then input 78 will be low. Since this different transmission link 14 is using the output 70, the selection input 80 is low. The output 84 is therefore high so that NOR gates 66, 86 are inhibited and passing of data and a request function prohibited.

Should a packet of data be received at inputs 58, 60 whilst the output 70 is in use the input 58 will initially, at least for the first bit, go low and the input 60 go high. This is always the case as data transmission coding is arranged so that a transmission will always start with a transition from low to high. The signal line 90 thus goes low to provide low inputs at NOR gates 86, 88 and 98. As the output is already in use, the output 82 is low and a high output is produced at NOR gate 98. The high output is received at OR gate 100 to produce a low signal at its output. The NOR gate 88 therefore receives two low inputs to produce a high output to NOR gates 86 and 66 and also feeds back to NOR gate 100 latching the interlock function 42 formed by gates 100 and 88. The NOR gates 86 and 66 therefore remain inhibited, thus data is not transmitted and a request signal is not generated for consideration by arbitrator 54.

Should the output become available while this data is still being received on transmission link 14, the signal line 90 will remain low and the input 78 returns to a high condition. The output 82 thus goes high and the output 84 low. NOR gate 98 therefore receives a high and a low input so that its output goes low. The output 42 of NOR gate 88 initially is high so that a high signal is received by OR gate 100. The output of OR gate 100 thus remains low to maintain the latched high condition at the output of NOR gate 88 and thus the interlock function 42. This maintains the inhibit of NOR gates 66 and 86 to prevent data transmission and generation of a request signal.

Upon the end of a data transmission, which has been so interlocked, which end may be the end of the packet or the result of termination by the transmission device, the line 90 returns to a high condition to provide a high input to NOR gate 88. As one input to NOR gate 88 is high its output goes low releasing the interlock to enable the NOR gate 66 and 86 and to provide two low inputs to OR gate 100. The output of OR gate 100 and consequently the input to NOR gate 88 is thus high. However, no data is presented for transmission and so no request signal or transmission occurs.

If the output 70 is available and data is received at the transmission link 14 of selector 52, the signal line 90 will go low producing low input at NOR gates 86, 88 and 98 as described above. The input 78 will be high in this condition, producing a high signal at output 82 and a low signal at output 84. All inputs to AND gate 86 are thus low and a high signal is produced at its output to generate a "request" signal. The arbitrator 54 identifies this request and selects it to produce a high signal at input 80 first and then a low signal at input 78. The output 84 thus remains low and the output 82 high to maintain the output of the interlock in its low condition and maintain the request signal at the output to NOR gate 86. The data input 62 to NOR gate 66 is passed to the output 70 since all other inputs to NOR gate 66 are low.

An indication that data is being transmitted is provided by a signal line 90 connected to an output 92 of buffer amplifier 56 through a buffer amplifier 94 and an RC circuit 96. At the end of the transmission the data line 60 goes low for more than 3 bit times so that the signal line 90 goes high, removing this request from the output from NOR gate 86, thus allowing the arbitrator to respond to subsequent request signals.

Accordingly it will be seen that a request signal is only generated when the output 70 is available and data is received on the transmission link 14. Further the interlock function 42 ensures that only part of a data packet is not transmitted.

To prevent the possibility of two request signals being generated at the same time, the arbitrator 54 is arranged to consider only one request at a time. The arbitrator 54 comprises an encoder 110 that is available as a standard item under code number 10165 and a decoder 112 available as code 10162. The encoder 110 is a cascade priority encoder that *combinatorially* reviews the eight inputs simultaneously. Upon a high input being detected, the encoder 110 provides through the encoding lines 114 a binary 3 bit code corresponding to the input selected. The decoder 112 provides a high output signal on the corresponding output 116, each of which forms an input 80 for a respective one of the selectors 52. The outputs 116 are also connected through OR gates 118 to a bus 120 connected through inverters 122 and 123 to provide a high signal when no request signal is selected. Since the output 114 is a binary 3 bit code and decoder 112 provides a 3 bit binary to 1 of 8 code conversion, only one output of decoder 112 can be present at the input to arbitrator 54. Another output 119 from encoder 110 is inverted by inverter 124 and used to disable all 8 outputs of decoder 112 should no input be present at the arbitrator 54.

Accordingly, only one input 80 can be selected at any one time and therefore only one switch function enabled at any one time. Since encoder 110 is a priority encoder, in the event that two or more simultaneous requests be made, the higher numbered requests wll be the one that is encoded on outputs 114, and therefore selected for transmission.

Figure 5:
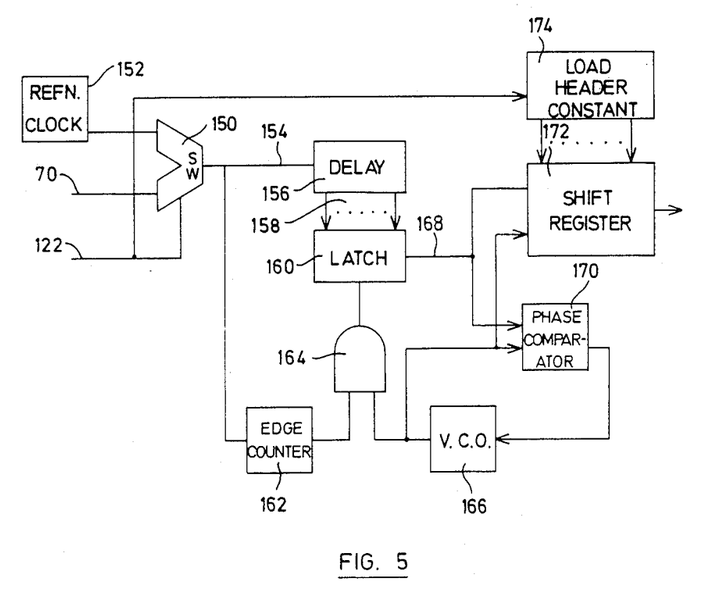
FIG. 5 is a schematic block diagram of a clock synchronisation system used in the network of FIG. 1
Figure 6:
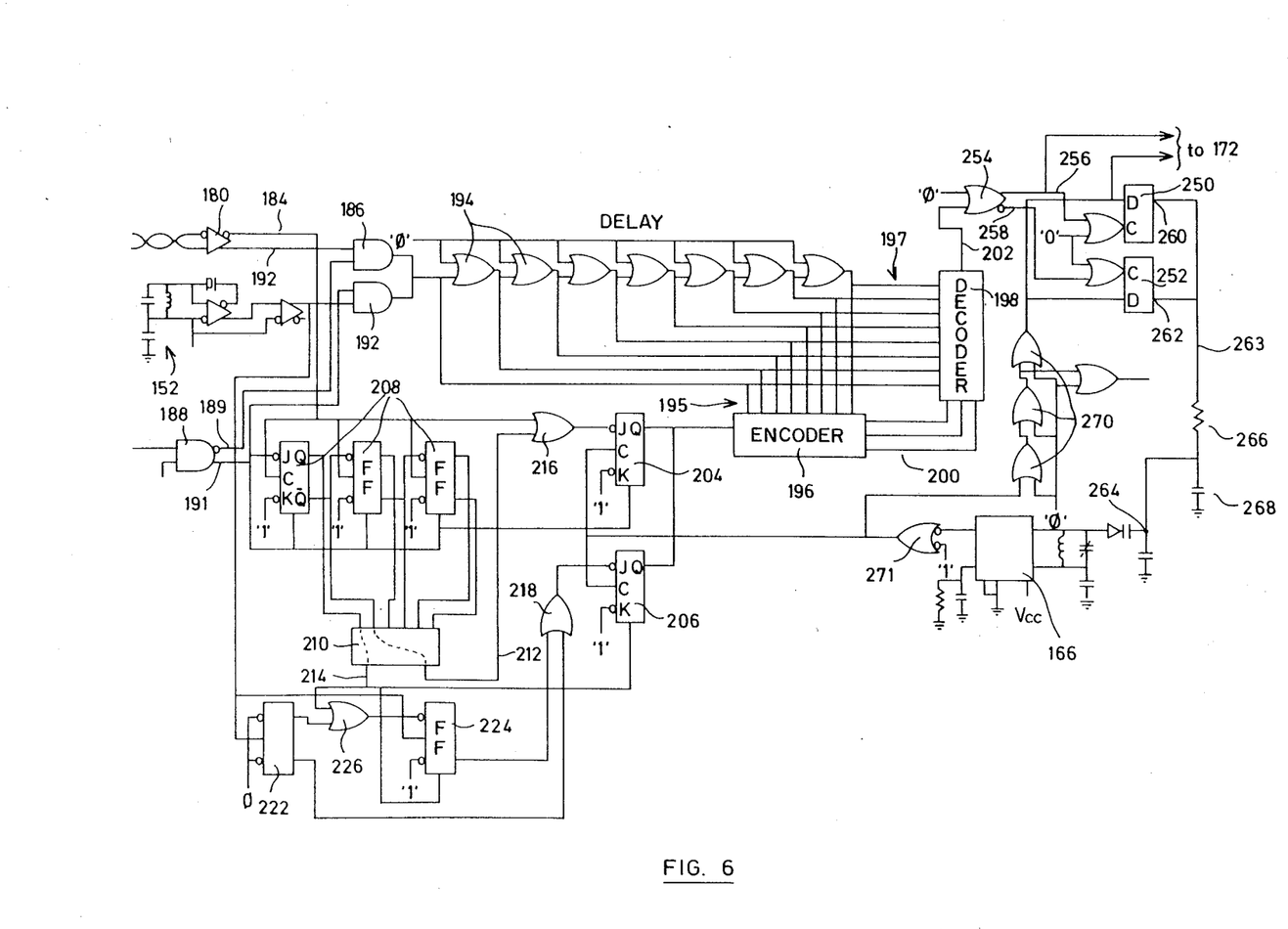
FIG. 6 is a schematic diagram of the circuit represented by FIG. 5

The transmission of data from a remote access controller may start at any time and is usually controlled by a separate clock in that controller. To process the data through the hub and retransmit it, it is necessary to synchronise the data transmission with the master clock in the hub. Conventional synchronisation devices use several bits at the start of the transmission to achieve synchronisation. A large number of synchronization bits hampers the transmission capability of the system as it increases the minimum packet length. To obviate this problem, a clock synchronisation system as shown in FIGS. 5 and 6 is used.

Access to the clock synchronistation system is controlled by switch 150 that is set by the output of the inverter 122 (FIG. 4) that provides the busy function signal 44. The inputs to the switch 150 are derived from a reference clock 152 and from the data output 70. If the output 70 is available, i.e. no data is being transmitted, the reference clock 152 is connected through the switch 150 to its output 154. Similarly, if data is being transmitted to the output 70, the switch 150 will connect the ouput 70 to its output 154 so that the output 154 will at all times by carry a signal. The output 154 is connected to a delay function 156 that has a plurality of discrete outputs 158. The outputs 158 are sequentially delayed by equal increments through the period of one data cell and provide inputs to a latch device 160. Thus a positive going edge on the output 154 will appear at the outputs 158 as a series of successive positive going edges spaced from the preceding edge by a discrete time interval.

The output 154 is also connected to an edge counter 162 that provides an output after a predetermined number of edges have been produced on the output 154. The output of edge counter 162 is connected to an AND function 164 that also receives an input from a voltage controlled oscillator (VCO) 166. The output of AND function 164 controls the latch device 160 so that it connects the input 158 that has most recently gone positive with the output 168 of the latch device 160 at the first rising edge from VCO 166 after the selected number of edges have occurred. The output 168 is connected to a phase comparator 170 that also receives the output of VCO 166. The phase comparator 170 compares the transitional edges of the data on the output 168 and the output of VCO 166 and produces a signal to adjust the frequency of the VCO 166 to bring the edges of the data cells and VCO pulses into synchronism. The delayed data path 168 is also connected to a shift register 172 clocked by the VCO output 172 to generate a data transmission output in synchronism with the VCO output. To reconstruct the header of each data transmission a parallel load facility 174 is connected to the shift register 172 and its contents copied into the data stream by a signal from the invertor 122 indicating the output 70 has become occupied.

The provision of the delay function 156 and the latch device 160 provides a coarse synchronisation between the VCO output and data transmission. With 8 outputs 158 the maximum variance between the two is 12.5%. The VCO control may then provide a fine synchronisation between the edges to bring the data and clock into synchronism. This two stage synchronisation reduces the number of bits and therefore the time required for synchronisation.

Figure 7:
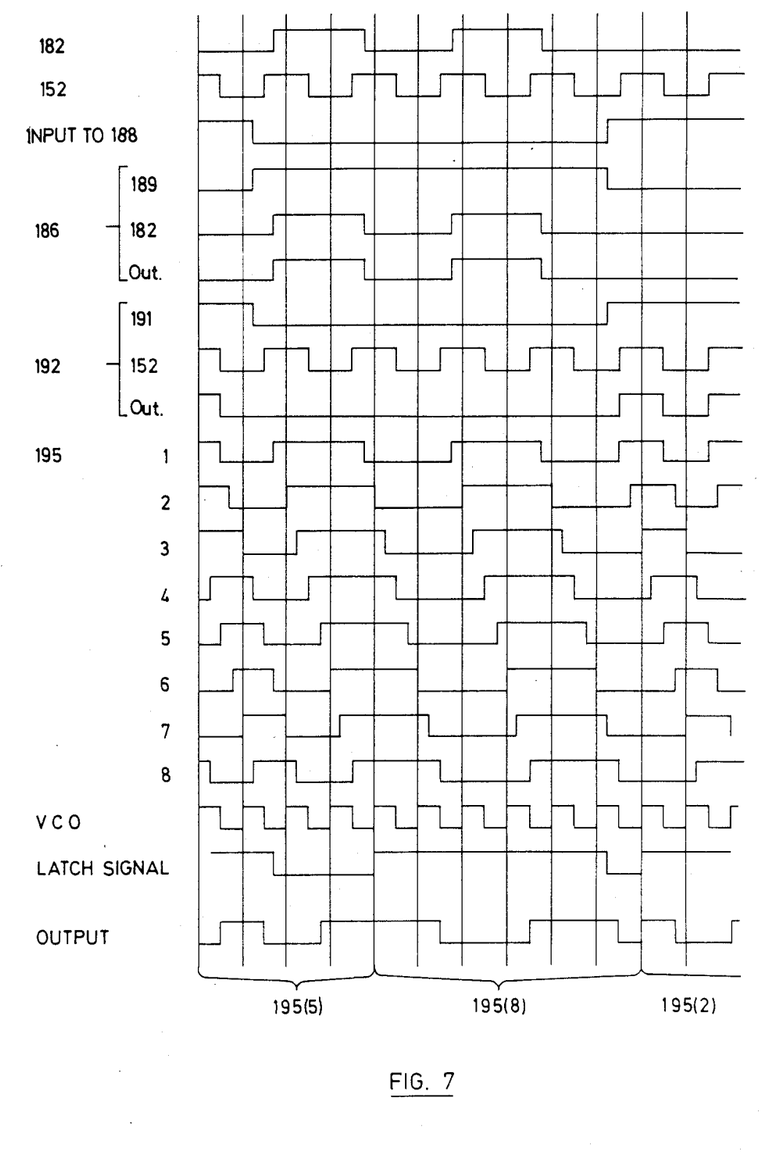
FIG. 7 is a timing diagram showing the interrelationship of the components of FIG. 6 during initial synchronisation.
Figure 8:
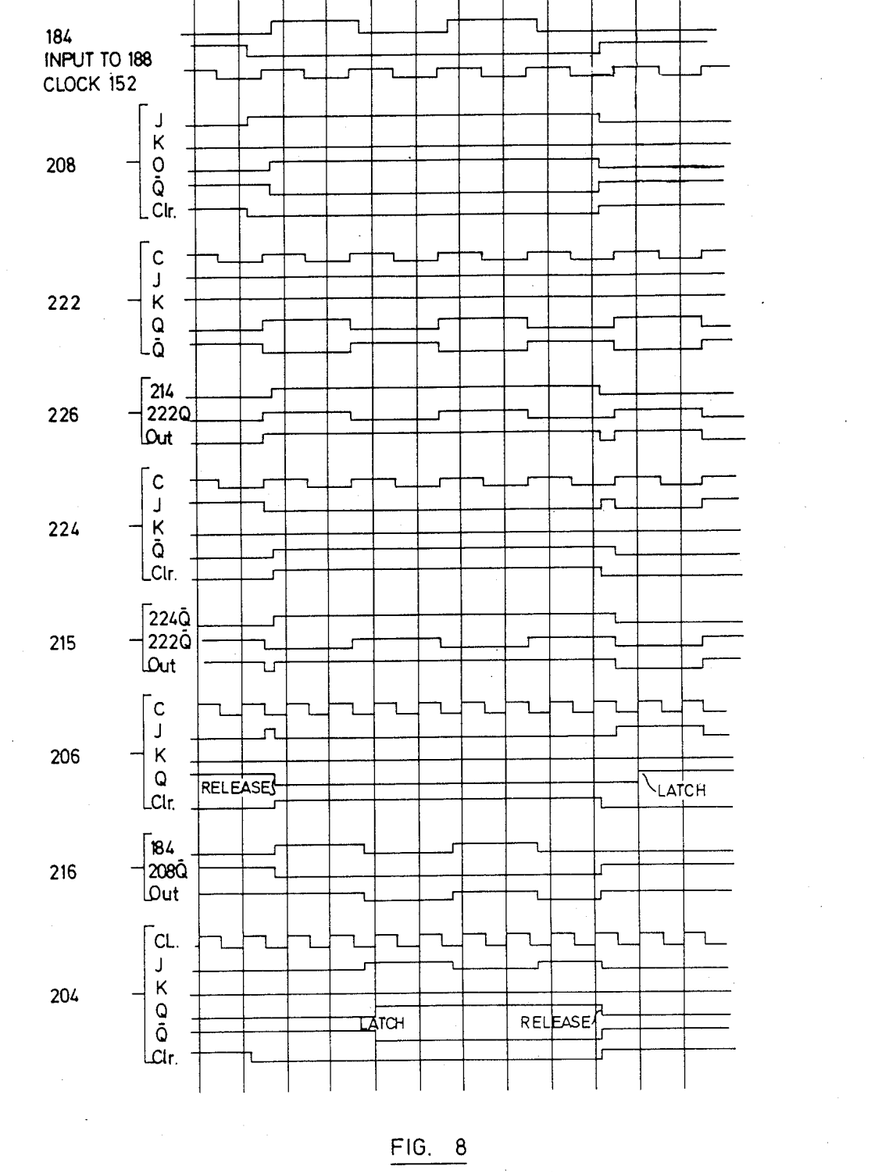
FIG. 8 is a timing diagram showing the interelationship of the components of FIG. 6 in generating a latch signal during initial synchronisation.

The details of the synchronisation system may be seen in FIG. 6 and the sequence of signals determined from the timing diagrams of FIGS. 7 and 8. The output 70 is connected through a buffer amplifier 180 to a true output 182, and a complement output 184. The output 182 is connected to an AND gate 186 that also receives as an input the inverted output 189 of an AND gate 188. The input to AND gate 188 is connected to the output of inverter 122 and so is low whenever the output is in use. The output 189 of AND 188 is thus high whenever the output 70 is in use so that AND gate 186 will pass data received from the buffer amplifier output 182.

A crystal reference clock 152 is connected through a buffer amplifier 190 to an AND gate 192. The AND gate 192 receives a second input, namely the output 191 of AND gate 188, that follows the output of inverter 122. Thus the AND gate 192 is only enabled to pass the pulses of clock 152 when the output 70 is available, i.e. when no data is being transmitted.

The AND gates 186, 188 and 192 constitute the switch 154 to select either the date transmission of output 70 or the pulses of clock 152 depending on whether or not the output 70 is occupied.

The outputs of AND gates 186, 192 form an input to a cascade of OR gates 194 that constitute the delay function 156. The input to each OR gate 194 is also connected to inputs 195 of an encoder 196 and to inputs 197 of a decoder 198. The encoder 196 and decoder 198 are interconnected by a data bus 200. The encoder 196 is a cascade priority encoder available as an integrated circuit under code number 10162 that allocates a priority to each input. Upon enabling, the encoder selects the high input with the highest priority and generates a binary code corresponding to that input on the data bus 200. The decoder 198 then connects the corresponding input 197 to its output 202 so that the most recently high input 197 is connected to the output 202. The OR gates 194 are connected to the inputs 195 such that the most delayed signal is accorded the highest priority and therefore the most recently high input is selected by the encoder.

The encoder 196 is enabled by the output of one of two flip flops 204, 206 that are clocked by the output of VCO 166 applied through NAND gate 271. The flip flop 204 receives an input from the edge counter 162 that is constituted by 3 J-K flip flops 208 connected in series and having inverters at the J K inputs. The clock input to each flip flop 208 is derived from the output 184 of buffer amplifier 180 so that the flip flops are clocked at each positive going edge of the data stream. Each data packet is organised to include a number of such edges at the start of each packet for synchronisation purposes. The K inputs of each of the flip flops 208 and 204 are supplied with a low signal through a common bus to prevent complementing of the outputs at successive clock pulses. The J input to the first of flip flops 208 is the inverted output 191 of AND gate 188 that remains low whenever data is transmitted across the output 70. Thus the J input to flip flop 208 is always high when the output 70 is occupied allowing the flip flops 208 to be clocked by successive rising edges at the output 184 of buffer amplifier 180. The first rising edge after the arbitrator 54 selects a port sets the Q output high and the "Q" low. Thereafter, each positive going clock edge sets the Q output of the next flip flop 208 high until all the Q outputs are set high. The flip flops remain in the set state until cleared by a high signal at the clear input. The clear signal is derived from the transition from low to high of the output of inverter 122 as the data transmission ends and the output 70 becomes available. Thus the flip flops 208 are reset at the end of each packet and remain in the reset condition until the output 70 is again busy.

The number of edges counted by the flip flops 208 is determined by the connections made within a jumper block 210 that connects outputs from the flip flops 208 to a pair of outputs 212, 214. The output 212 is used to connect the flip flop 204 through an OR gate 216 to one of the "Q" outputs of flip flop 208. Thus the signal to OR gate 216 goes from high to low at the predetermined clock pulse. The OR gate 216 also receives an input from the output 184 of buffer amplifier 180 which performs the clocking function of flip flops 108. The output of OR gate 216 is inverted and applied to the J input of flip flop 204 so that upon a low output from the OR gate 216 a high signal appears at the J input to provide a latching signal at the output of flip flop 204 upon application of a clock pulse. A low output of OR gate 216 is provided when the pulse train at output 184 is low and when the output 212 of jumper block 210 is low indicating that required number of pulses has elapsed from the start of the message. The latching signal is generated as a high signal at the Q output of flip flop 204 upon receipt of a positive going edge from the VCO 166 that is running at twice the frequency of data stream 170 and crystal reference clock 152. The encoder 196 is thus latched to connect the most recently positive input of the encoder with the output of decoder 198 and achieve a coarse synchronisation between the VCO 166 and the data stream.

Upon termination of the data transmission, the clear signal of flip flops 208 is also applied to the flip flop 204 to reset the flip flop and return the Q output to 0.

To prevent undue drift of the VCO during periods when the output 70 is available the standby clock 152 is used as a synchronisation signal. The output of standby clock is used to generate a latching signal from the flip flop 206 by clocking a pair of JK flip flops 222, 224. The J and K inputs of flip flop 222 are constantly high so that the Q and "Q" outputs complement at each positive going clock edge. The "Q" output is connected directly to an OR gate 218 whose output is connected to the inverted J input of flip flop 206.

The Q output of flip flop 222 is connected to an OR gate 226 that receives as its other input the output 214 of jumper block 210. The output 214 is connected to a selected one of the Q outputs of the flip flops 208 and so will be low whenever the output 70 is available i.e. the clear signal is applied, and go high after the predetermined number of edges has occurred. Whilst the output 70 is available the output of OR gate 226 will therefore follow the Q output of flip flop 222 and alternate between high and low states in sympathy with positive going edges of the clock pulse. The flip flop 224 is cleared by a high signal at the output 214 so that at the end of a data transmission the "Q" output of flip flop 224 is high. Upon the Q output of flip flop 222 going low in response to a clock pulse, a high signal will be received at the J input of flip flop 224 to drive the "Q" output low and maintain it in that condition until reset to high by a high signal at the output 214, i.e. at the start of a data transmission.

The "Q" output of flip flop 224 is connected as the second input to OR gate 218 and so will provide a low input whenever data is not being transmitted. When both inputs to OR gate 218 are low, i.e. when "Q" output of flip flop 224 has been driven low by the J output of flip flop 222 and the "Q" output of flip flop 222 is in a low condition, a high output is received at the J input to flip flop 204 so that the next positive going edge of the VCO 166 clocks the flip flop to set the Q output high and thereby latch the encoder 196. A course synchronisation is thus obtained between the pulses produced by the standby clock 152 and VCO pulses to provide a reference signal for the VCO pulses.

At the start of the data transmission, the output 214 changes from low to high and thereby clears the flip flop 206 to provide a low signal at its Q output and to release the encoder 196. The flip flop 224 is also cleared to provide a high signal at the "Q" output and prevent setting of the flip flop 206. The "Q" output is held high during the data transmission by the application of a high input to OR gate 226 from the output 214 which provides a low signal to the J input of flip flop 224 and so produces no change at the output of the flip flop 224 upon application of a clock pulse. The relationship between the various components of the latching function is shown in the timing diagram of FIG. 8.

Fine synchronisation between the VCO and the data stream is provided by the phase comparator 166 that compares the leading and trailing edges of the data stream with the rising edges of the VCO output and adjusts the VCO to bring the edges into phase. The phase comparator 170 comprises a pair of D-type flip flops 250, 252, one of which, 258 is clocked by the rising edge of the data stream and the other of which is clocked by the falling edge. The data stream is delivered to the clock inputs from output 202 of decoder 192 through OR gate 254. The OR gate 254 has two outputs 256, 258, one of which, 254, is inverted. The output 256 is connected to the clock input of rising edge flip flop 250 so that a positive going edge in the data stream clocks the flip flop and sets its output 260. The output 258 is connected to falling edge flip flop 252 so that a negative going edge in the data stream produces a positive going edge at the clock input to set the output 262 of the flip flop. The outputs 260, 262 are connected to one another to provide a control voltage bus 263 to the input 264 of the phase comparator 166. The control voltage in the bus 263 is applied to the VCO control input 264 through an integrating circuit provided by resistor 266 and capacitor 268 chosen to provide a suitable response characteristic for changes in the control voltage in the bus 263.

The set input for the flip flops 250, 252 is derived from the output of VCO 166 and is applied to the flip flops through a series of OR gates 270 that introduce a delay corresponding to the data processing delay introduced by the circuit components such as flip flops 204, 206. This ensures that the clock and set inputs are sychronised in real time although they may be phase shifted. Each flip flop 250, 252 compares the position of the positive going edge of the VCO output with clocking edge of the data stream and provides an output indicative of the relative position. Thus if the clock pulse is in advance of the positive going edge of the VCO output a zero putput is set at the output of the flip flop to provide a minimum control voltage. This causes an increase in the frequency of the VCO output to bring the next positive going edge closer to the clocking edge of the data stream. Similarly, if the positive going edge of VCO 166 is in advance of the clocking edge, a high signal is set at the output of the flip flop to increase the control voltage and decrease the frequency, thereby retarding the next positive going edge relative to the clocking edge.

The provision of two flip flops clocked at opposite edges of the clock signal enables the phase of the VCO output and data stream to be compared each half period so that a persistent high signal maintains the control voltage and provides a progressive continuous adjustment. The integrating circuit in the control bus protects the VCO output from rapid transitions of the control voltage and enables a steady state control voltage to be obtained. The output of VCO 166 thus settles to the phase and frequency of the data stream with drifts from that condition being compensated by changes in the control voltage. Because of the course synchronisation obtained from the delay function 194, the phase synchronisation may be obtained more rapidly and held to finer tolerances.

Whilst it is believed that the above description provides sufficient detail to enable the invention to be practised a listing of the components forming the circuits shown in FIGS. 4 and 6 is set out below:

| Ref. Numeral | Component No. or value |
|---|---|
| 66 | 10109 |
| 56 | 10116 |
| 68 | 10109 |
| 76 | 10109 |
| 88 | 10102 |
| 94 | 10116 |
| 98 | 10102 |
| 100 | 10102 |
| 110 | 10165 |
| 112 | 10162 |
| 118 | 10109 |
| 122 | 10104 |
| 123 | 10104 |
| 124 | 10104 |
| 152 | 10116 |
| 180 | 10116 |
| 188 | 10104 |
| 192 | 10104 |
| 194 | 10103 |
| 188 | 10104 |

-continued

| Ref. Numeral | Component No. or value |
|---|---|
| 208 | 10135 |
| 222 | 10135 |
| 224 | 10135 |
| 226 | 10103 |
| 218 | 10103 |
| 204 | 10135 |
| 206 | 10135 |
| 216 | 10103 |
| 196 | 10165 |
| 198 | 10164 |
| 271 | 10104 |

N.B. The symbol "Q" has been used to denote the inverse of the Q output conventionally denoted by $\bar{Q}$.

We claim:

1. A data transmission network comprising a plurality of access controllers each of which is connected by a transmitter and a receiver to a hub for transmission of data between the access controllers, said hub comprising selection means connected to the transmitter of each of said access controllers and operable to select a single one of said transmitters, broadcast means connected to the receiver of each of said access controllers, to transmit to each of said access controllers, and a nexus connecting said selection means and said broadcast means to transmit said data therebetween, said selection means including a plurality of selectors each of which is associated with a respective access controller to control flow of data from said access controller to said nexus and arbitrator means to enable one of said selectors and disable the remainder to ensure transmission of data from one access controller only.

2. A data transmission network according to claim 1 wherein each of said selectors controls a switch function controlling flow of data from its respective access controller to said nexus.

3. A data transmission network according to claim 2 wherein each of said selectors includes a request function connected to said arbitrator to request access to said nexus.

4. A data transmission network according to claim 3 wherein each of said selectors includes a disabling switch controlled by said arbitrator and operable to disable said switch function and said request function when said nexus is occupied by transmission of data by access controller other than its respective access controller.

5. A data transmission network according to claim 4 wherein said arbitrator controls said disabling switch of each of said selectors by two signals, one of which is common to each of said selectors and indicates that said nexus is occupied and the other of which is peculiar to that respective access controller and indicates that the access controller has been selected for connection to said nexus.

6. A data transmission network according to claim 5 wherein an interlock function is provided in each of said selectors to disable said request function and said switch function, said interlock function being operable upon a data transmission being received at an access controller whilst said nexus is occupied to maintain said request function and switch function disabled until said data transmission is ended, whereby access to said nexus of said data transmission is prevented after the start of said transmission.

7. A data transmission network according to claim 6 wherein said interlock is controlled by a switch responsive to the presence of a data transmission and the output of said disabling switch.

8. A data transmission network according to claim 1 wherein said arbitrator includes an encoder having a plurality of inputs, and generating an output indicative of the input on which signal is received, a decoder for receiving a signal and provided an output signal of one of plurality of outputs dependent on the signal received and a data bus connecting the output of said encoder to the input of said decoder whereby a signal generated by said encoder produces a signal at only one output of said decoder.

9. A data transmission network according to claim 8 wherein said outputs are connected to respective ones of said selectors to enable the associated selector.

10. A data transmission network comprising a plurality of access controllers each of which is connected by a transmitter and a receiver to a hub for transmission of data between said access controllers, said hub comprising selection means connected to the transmitter of each of said access controllers, broadcast means connected to each said receiver to transmit data to each of said access controllers and a nexus connecting said selection means to said broadcast means, said selection means including an arbitrator to select a single one of said transmitter and connect it to said nexus, said arbitrator comprising an encoder having a plurality of inputs each of which is associated with a respective one of said transmitters, and generating at an output a signal indicative of the input at which a data transmission is received, a decoder having an input and a plurality of outputs and operable to connects said input with one of said outputs dependant upon the signal received at said input and a data bus connecting the encoder output and decoder input whereby receipt of a signal at one of said inputs of said encoder produces a signal at one of outputs of the decoder.

11. A data transmission network according to claim 10 wherein the outputs of said decoder are connected to respective disabling functions each associated with a respective one of said access controllers whereby a signal at one said access controller inhibits the corresponding disabling function and permits connection of said access controller to said nexus.

* * * * *